US012669143B2

(12) United States Patent
Wei

(10) Patent No.: US 12,669,143 B2
(45) Date of Patent: Jun. 30, 2026

(54) UNIVERSAL CONNECTING ROD ASSEMBLY

(71) Applicant: Chung Chin Wei, Taichung City (TW)

(72) Inventor: Chung Chin Wei, Taichung City (TW)

( * ) Notice: Subject to any disclaimer, the term of this patent is extended or adjusted under 35 U.S.C. 154(b) by 306 days.

(21) Appl. No.: 18/638,719

(22) Filed: Apr. 18, 2024

(65) Prior Publication Data

US 2024/0360858 A1     Oct. 31, 2024

(51) Int. Cl.
*F16B 7/00*          (2006.01)
(52) U.S. Cl.
CPC ...................................... *F16B 7/00* (2013.01)
(58) Field of Classification Search
CPC .. F16B 7/00; F16B 7/0493; F16B 7/14; F16B 9/02; F16B 9/09; F16B 9/05
USPC ............ 403/381, 207, 345, 346, 363, 83, 98
See application file for complete search history.

(56) References Cited

U.S. PATENT DOCUMENTS 4,079,995 A * 3/1978 Beckley ................... A47C 3/00
                                                    403/171
5,185,982 A * 2/1993 Hostetler ............... F16B 12/00
                                                    403/219

6,786,337 B2 * 9/2004 Klein ........................ A47F 5/01
                                                    211/189
8,302,363 B1 * 11/2012 Johnson .................. H02S 20/00
                                                    52/655.1
8,876,145 B1 * 11/2014 Bernal .................... B62B 3/008
                                                    280/638
11,406,189 B2 * 8/2022 Schlanger .............. A47B 96/14

* cited by examiner

*Primary Examiner* — Daniel J Wiley
(74) *Attorney, Agent, or Firm* — LANWAY IPR SERVICES; Chun-Ming Shih

(57) ABSTRACT

A universal connecting rod assembly contains: multiple elongated rods, and a respective one elongated rod includes an upper face and a lower face opposite to the upper face. The upper face has a slot and a first male multi-angle connection portion. The lower face has a groove and a first female multi-angle connection portion. The upper face also has at least one trench and a second male multi-angle connection portion. The lower face has at least one notch defined and a second female multi-angle connection portion. In addition, the at least one notch is not aligned with the at least one trench. The respective one elongated rod further includes multiple spaced through orifices passing there-through, and a respective one through orifice has at least one hexagonal hole defined on at least one end thereof.

8 Claims, 15 Drawing Sheets

93

96

1

97

1

UNIVERSAL CONNECTING ROD ASSEMBLY

TECHNICAL FIELD

The present disclosure relates to a universal connecting rod assembly which is capable of connecting multiple elongated rods to form a daily necessity or commercial supplies based on using requirements.

BACKGROUND

Currently, there is no commercially available product that uses a pole as a basic component, and then uses multiple basic components to assemble various daily necessities or commercial supplies, such as hangers, advertising signs, flagpoles, frames, display racks, billboards, etc.

If desiring to make a clothes hanger, it is required to make the clothes hanger with specific relevant materials, and the clothes hanger can only be used as a clothes hanger. Advertising signs are also made of iron pipes that have been cut and welded. After production, the advertising signs can only be used exclusively for signboards. It cannot be used for other purposes, including flagpoles, frames, display stands, billboards, etc.

In other words, each product can only be made from separate materials and used alone, which not only causes a waste of materials, but also disassembles the materials and cannot be used for other purposes.

Furthermore, the size and shipment of a complete product are both problematic, especially due to today's shipment volume restrictions. If not careful, it will double the cost, thus causing trouble and waste.

The present invention has arisen to mitigate and/or obviate the afore-described disadvantages.

SUMMARY

A primary aspect of the present invention is to provide a universal connecting rod assembly which is capable of connecting multiple elongated rods to form a daily necessity or commercial supplies based on using requirements.

To obtain above-mentioned aspect, a universal connecting rod assembly provided by the present invention contains: multiple elongated rods, and a respective one elongated rod includes an upper face and a lower face opposite to the upper face.

The upper face has a slot defined on a side thereof, and a first male multi-angle connection portion adjacent to a head end of the slot.

The lower face has a groove defined on a side thereof, and a first female multi-angle connection portion proximate to a distal end of the groove.

The upper face also has at least one trench defined close to a center thereof, and a second male multi-angle connection portion formed on the at least one trench.

The lower face has at least one notch defined close to a center thereof, and a second female multi-angle connection portion. The at least one notch is not aligned with the at least one trench.

The respective one elongated rod further includes multiple spaced through orifices passing therethrough, and a respective one through orifice has at least one hexagonal hole defined on at least one end thereof.

Other objects and features will be in part apparent and in part pointed out hereinafter.

DETAILED DESCRIPTION

Figure 12:
FIG. 12 is a perspective view showing the operation of a part of the universal connecting rod assembly according to the preferred embodiment of the present invention.
Figure 13:
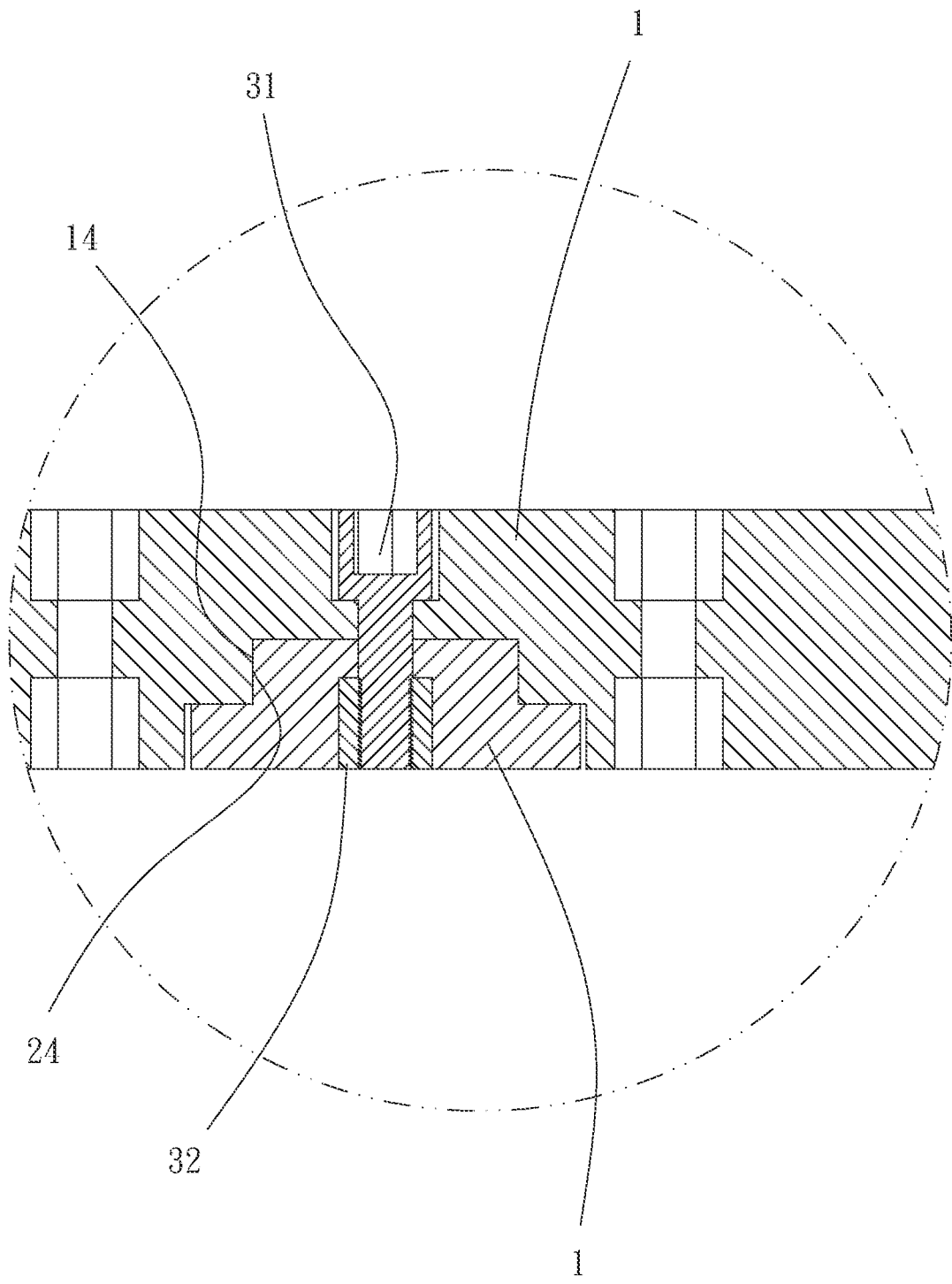
FIG. 13 is a cross sectional view showing the operation of a part of the universal connecting rod assembly according to the preferred embodiment of the present invention.
Figure 14:
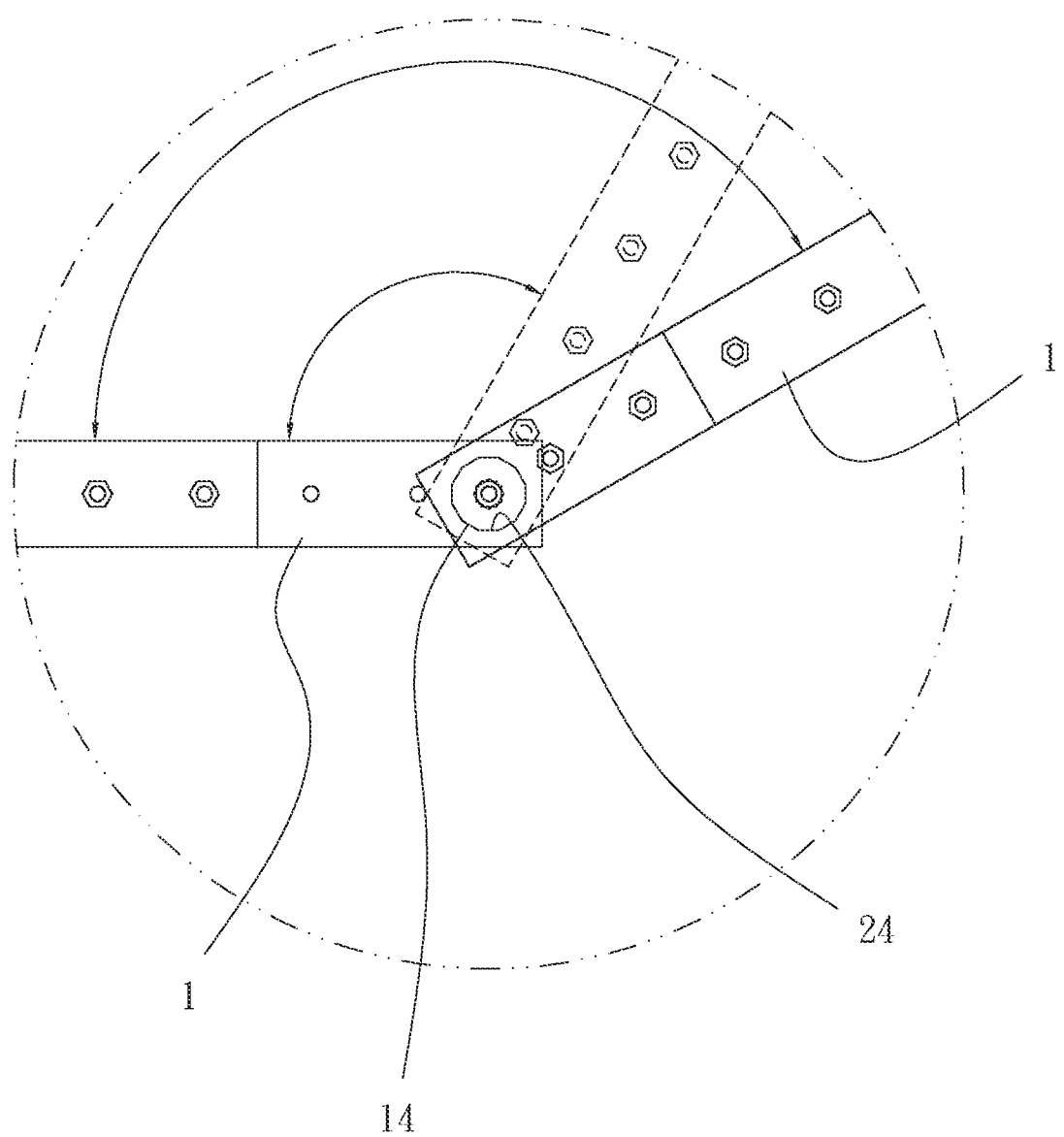
FIG. 14 is a side plan view showing the operation of a part of the universal connecting rod assembly according to the preferred embodiment of the present invention.

With reference to FIGS. 1 and 12-14, a universal connecting rod assembly according to a preferred embodiment of the present invention comprises: multiple elongated rods 1, and a respective one elongated rod 1 includes an upper face 10 and a lower face 20 opposite to the upper face 10, wherein the upper face 10 has a slot 12 defined on a side thereof, and a first male multi-angle connection portion 14 adjacent to a head end of the slot 12. The lower face 20 has a groove 22 defined on a side thereof, and a first female multi-angle connection portion 24 proximate to a distal end of the groove 22. The upper face 10 has at least one trench 11 defined close to a center thereof, and a second male multi-angle connection portion 14 formed on the at least one trench 11. The lower face 20 has at least one notch 21 defined close to a center thereof, and a second female multi-angle connection portion 24, wherein the at least one notch 21 is not aligned with the at least one trench 11. The respective one elongated rod 1 further includes multiple spaced through orifices 2 passing therethrough, wherein a respective one through orifice 2 has at least one hexagonal hole 13, 23 defined on at least one end thereof, such that the first male multi-angle connection portion 14 and the second female multi-angle connection portion 24 are adjustably connected, as shown in FIG. 14. One of the at least one hexagonal hole 13 or 23 is configured to receive a screw 31. Alternatively, the one hexagonal hole 13 or 23 is locked on a wall to hang daily necessities (such as a coat hanger) or commercial supplies. On the other hand, the other hexagonal hole 13 or 23 is connected with a nut 32 so that the screw 31 is screwed with the nut 32 (as shown in FIGS. 12 and 13), thus connecting two elongated rods 1. After the two elongated rods 1 are connected, the upper face of the one elongated rod 1 is coplanar with the lower face of the other elongated rod 1, and the lower face of the one elongated rod 1 is coplanar with the upper face of the other elongated rod 1, thus connecting the multiple elongated rods 1 flatly.

Figure 1:
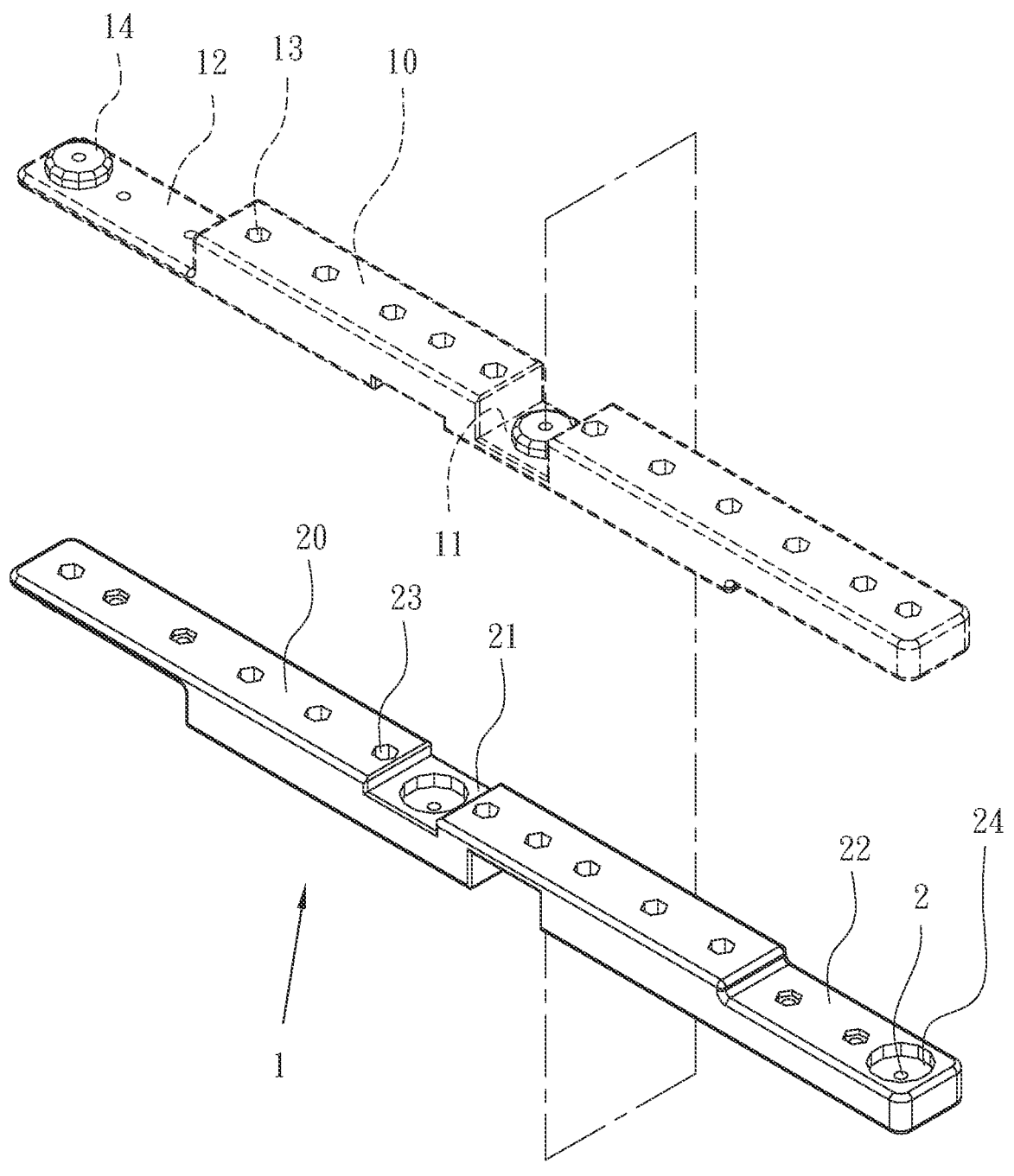
FIG. 1 is a perspective view showing the exploded components of a universal connecting rod assembly according to a preferred embodiment of the present invention.
Figures 15A, 15B, 15C, 15D:
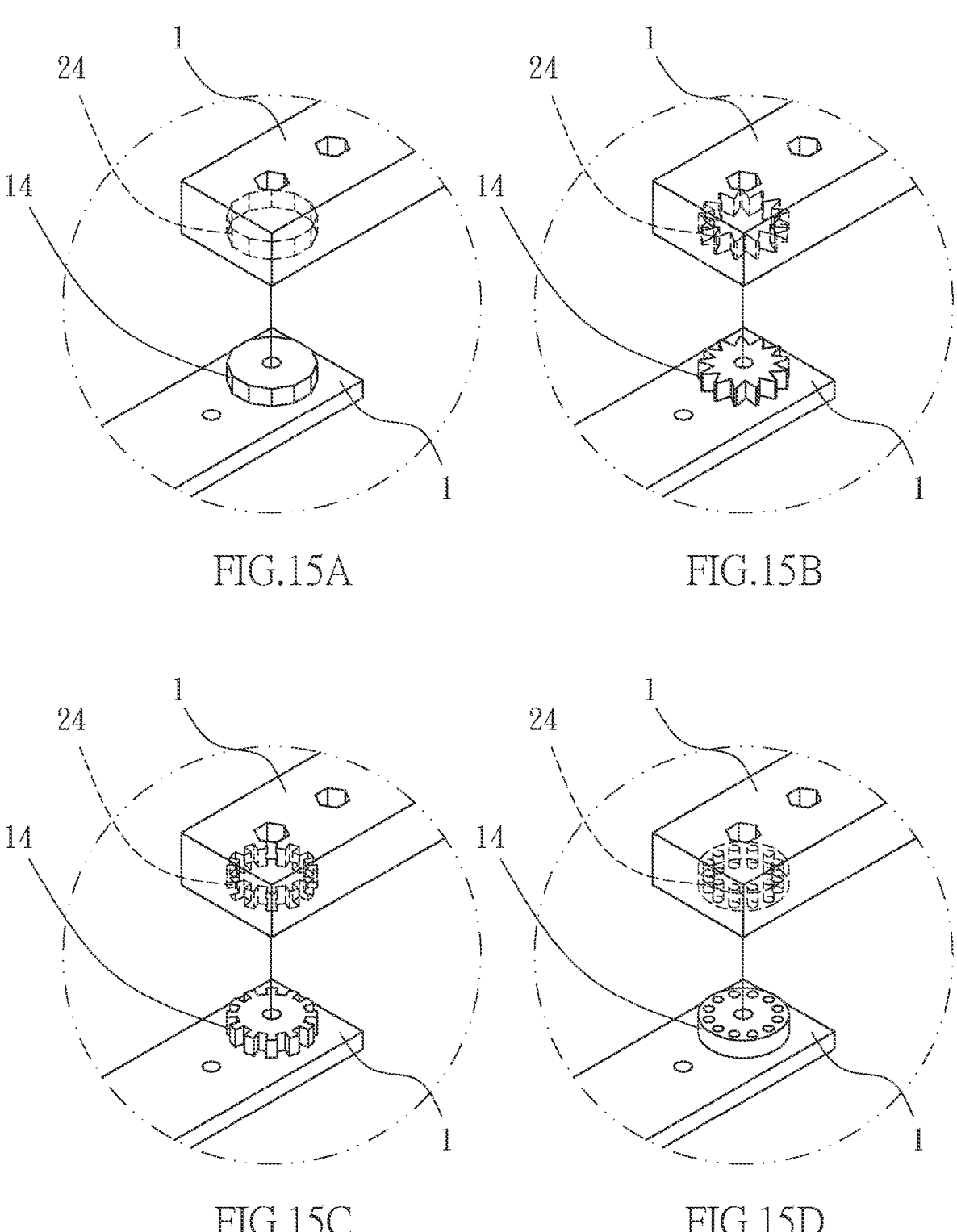
FIG. 15A is a perspective view showing the operation of a part of the universal connecting rod assembly according to the preferred embodiment of the present invention.
FIG. 15B is another perspective view showing the operation of a part of the universal connecting rod assembly according to the preferred embodiment of the present invention.
FIG. 15C is also another perspective view showing the operation of a part of the universal connecting rod assembly according to the preferred embodiment of the present invention.
FIG. 15D is still another perspective view showing the operation of a part of the universal connecting rod assembly according to the preferred embodiment of the present invention.

Referring to FIGS. 1 and 15A to 15 D, the first male multi-angle connection portion 14 and the second female multi-angle connection portion 24 are adjustably connected in any one shape of a connection of a polygonal column and a polygonal hole, a connection of multiple teeth, a connection of multiple squares, a connection of multiple arcuate protrusions, a connection of multiple columns and recessed holes, and a connection of multiple protrusions and recesses.

Figure 2:
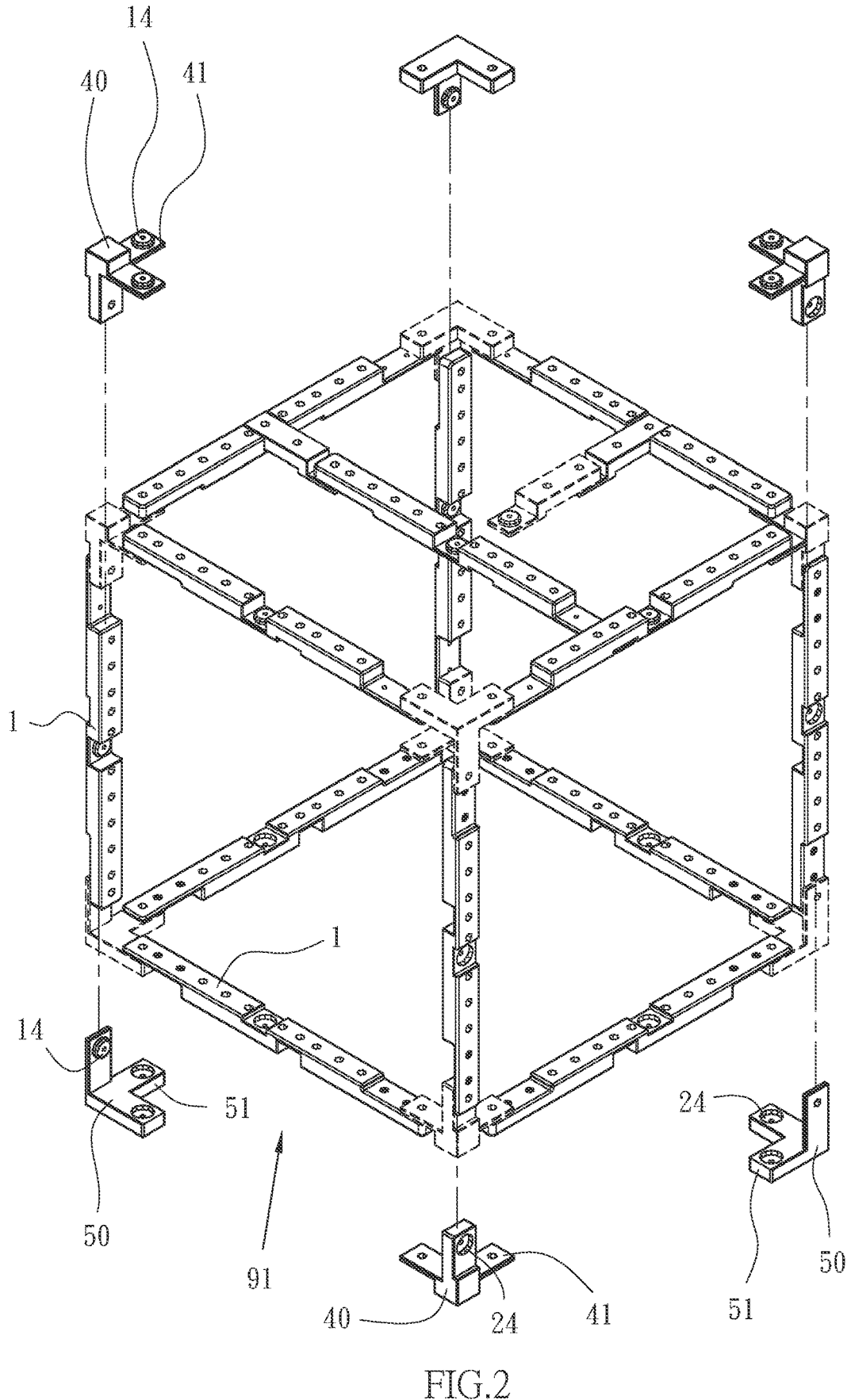
FIG. 2 is a perspective view showing the application of the universal connecting rod assembly according to the preferred embodiment of the present invention.

As shown in FIGS. 1 and 2, the multiple elongated rods 1 are configured to mate with multiple first connectors 40 and multiple second connectors 50 to connect a three-dimensional frame 91, wherein a respective one first connector 40 includes three axial protrusions 41, two first male multi-angle connection portions 14 of two of the three axial protrusions 41, and a second female multi-angle connection portion 24 of the other axial protrusion 41. A respective one second connector 50 includes three axial projections 51, two second male multi-angle connection portions 24 of two of the three axial projections 51, and a first male multi-angle connection portion of the other axial projection 51.

Figure 3:
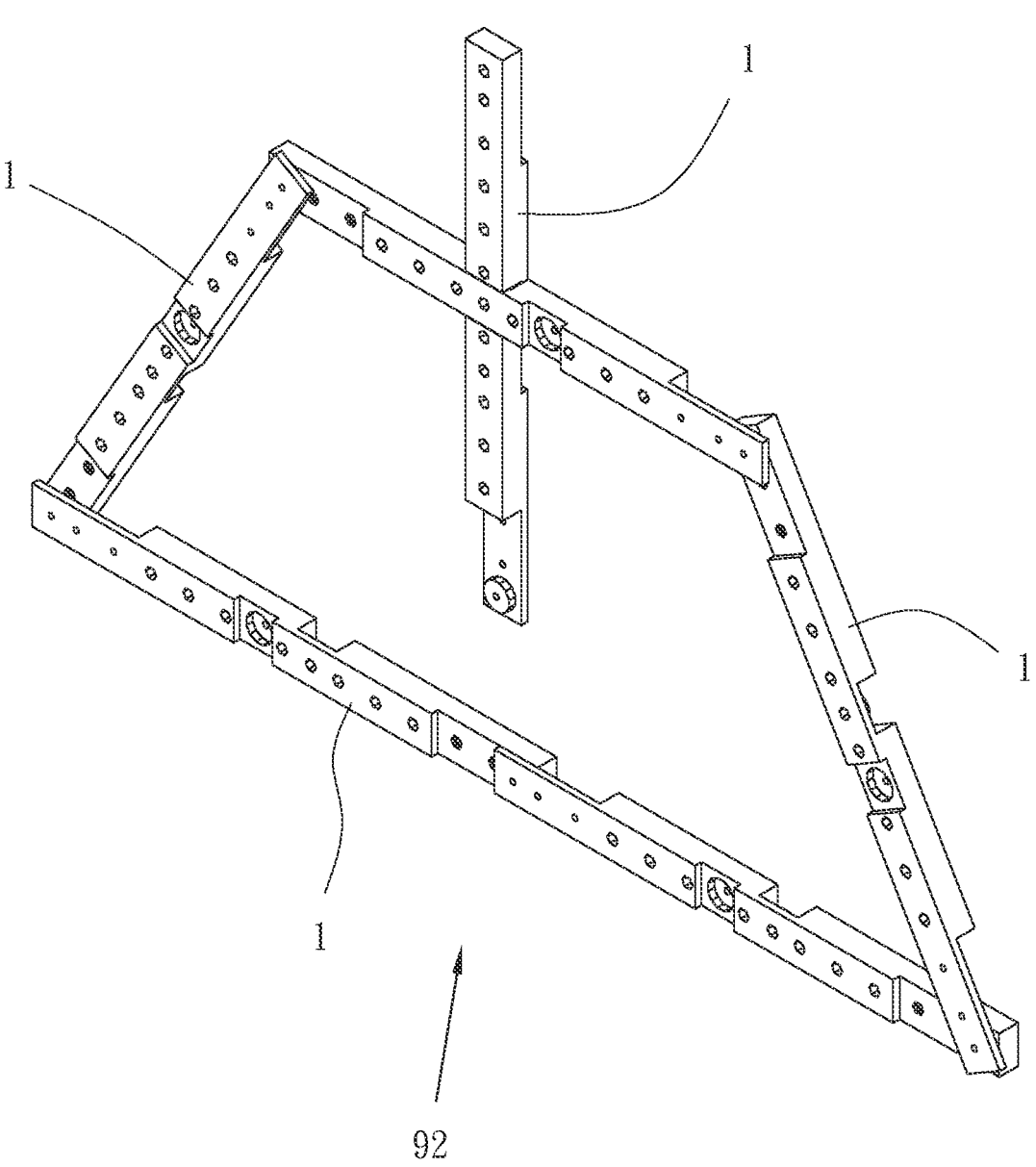
FIG. 3 is another perspective view showing the application of the universal connecting rod assembly according to the preferred embodiment of the present invention.
Figure 4:
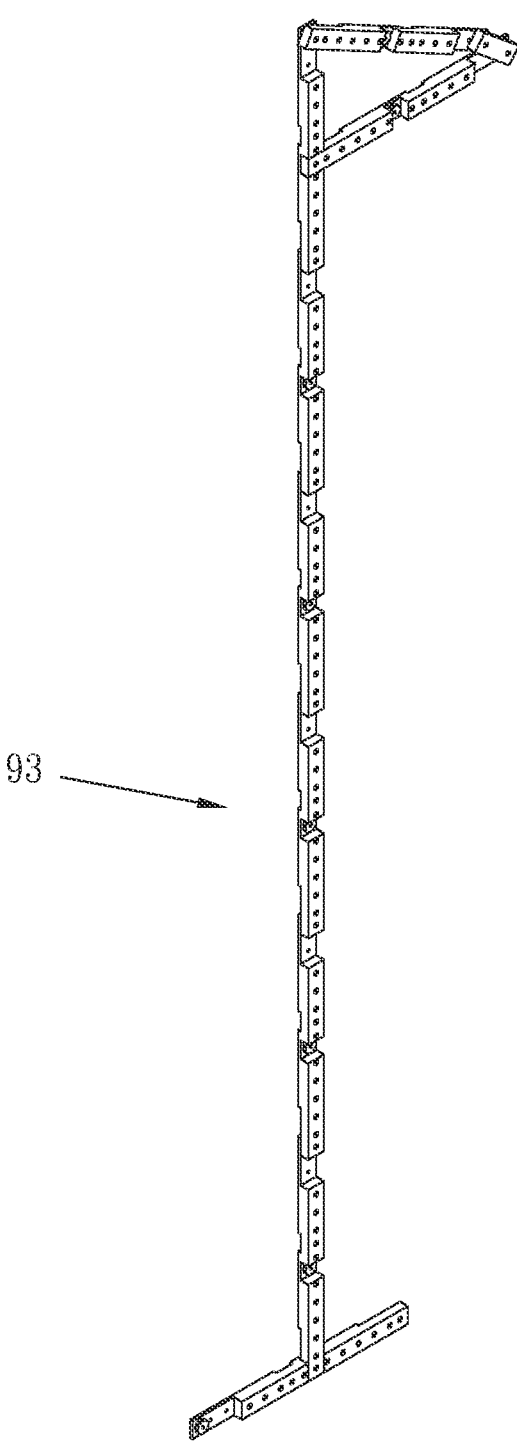
FIG. 4 is also another perspective view showing the application of the universal connecting rod assembly according to the preferred embodiment of the present invention.
Figure 5:
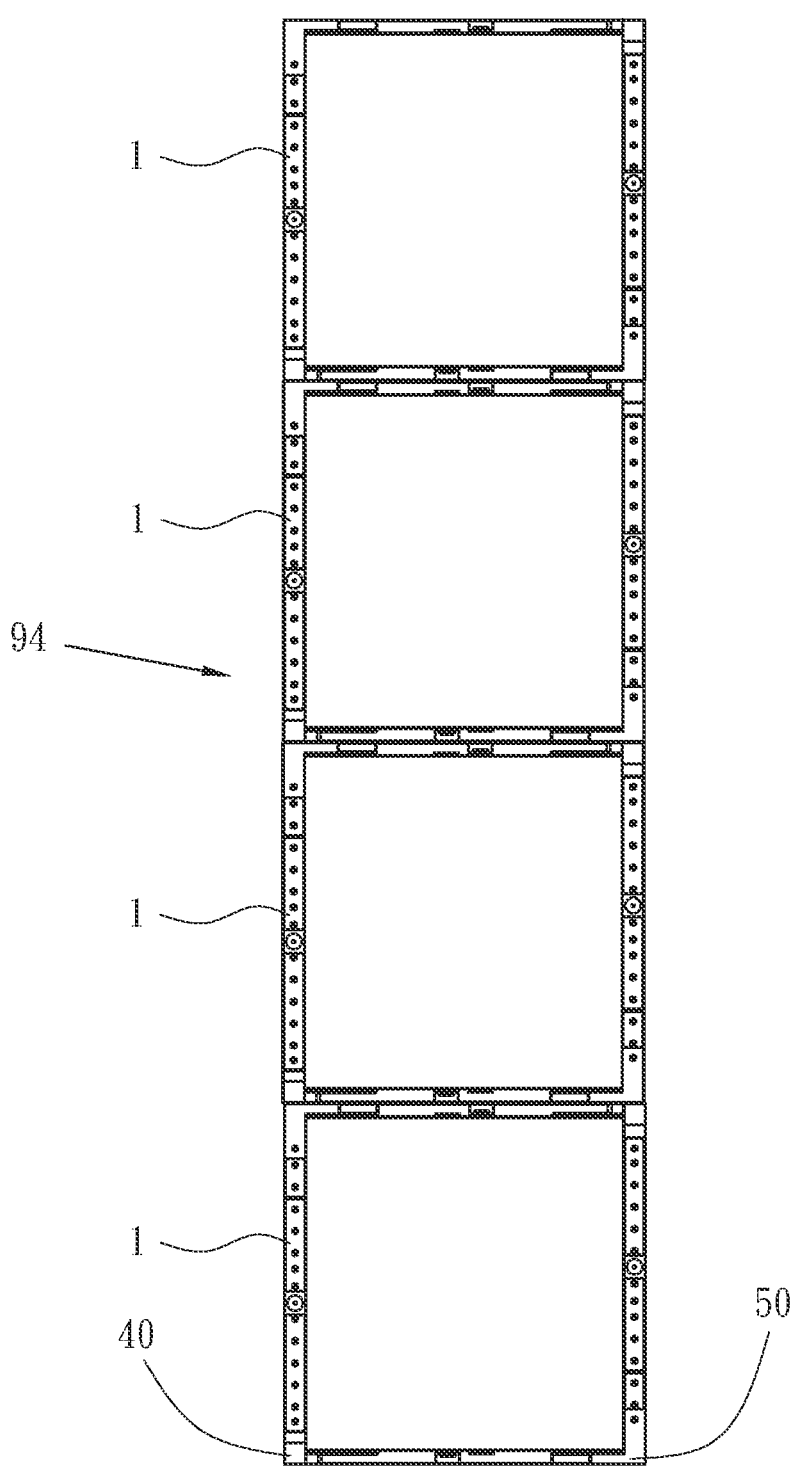
FIG. 5 is a side plan view showing the application of the universal connecting rod assembly according to the preferred embodiment of the present invention.
Figure 6:
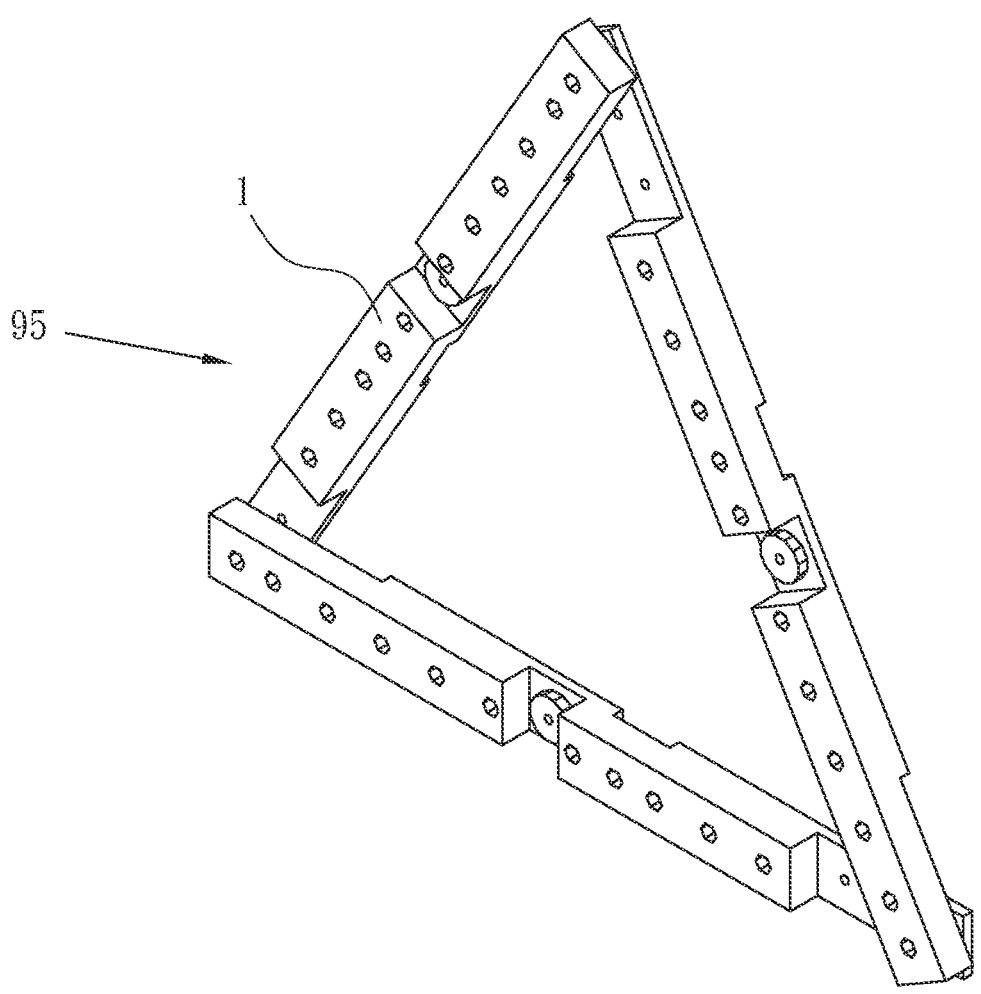
FIG. 6 is still another perspective view showing the application of the universal connecting rod assembly according to the preferred embodiment of the present invention.
Figure 7:
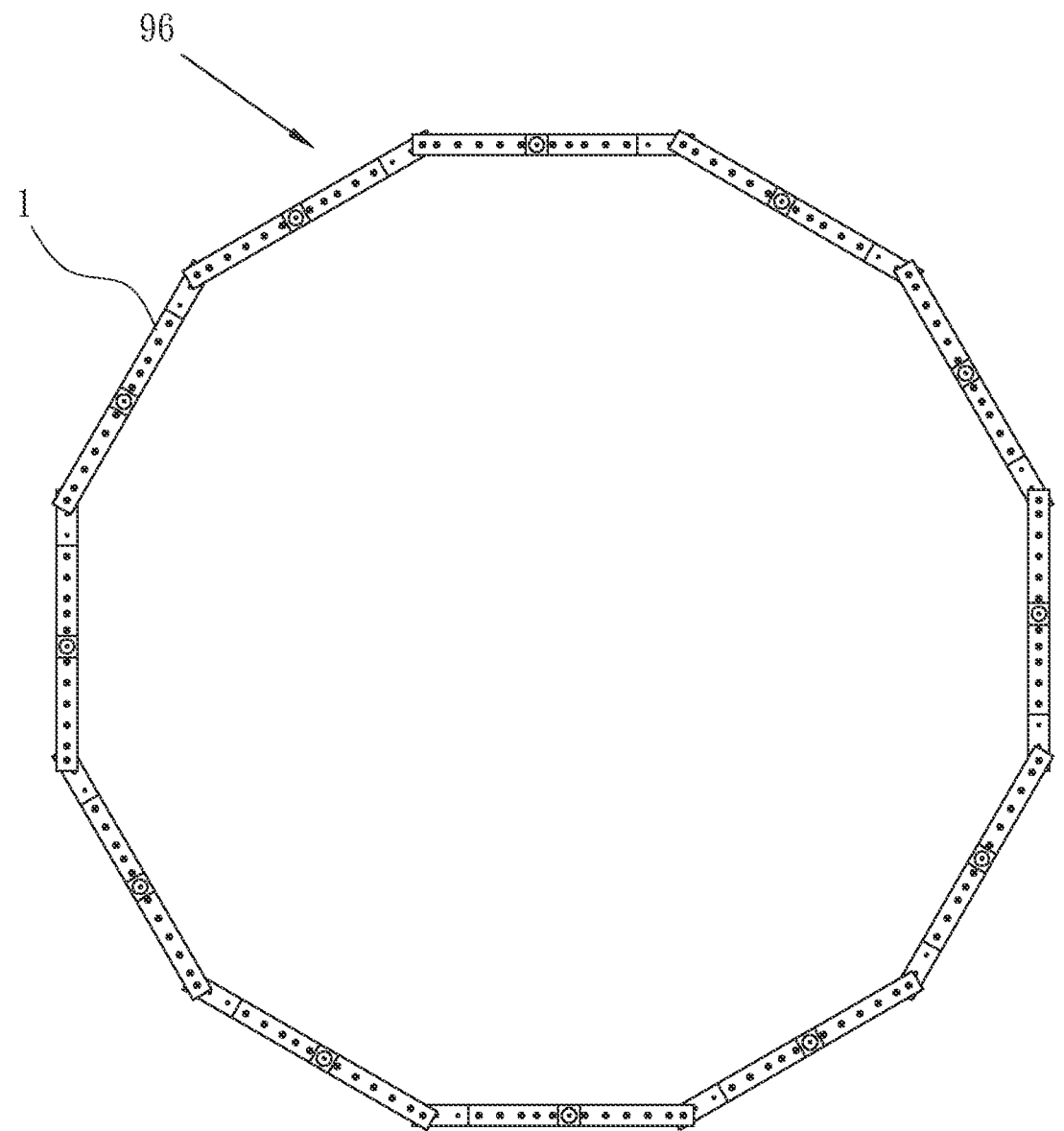
FIG. 7 is another side plan view showing the application of the universal connecting rod assembly according to the preferred embodiment of the present invention.
Figure 8:
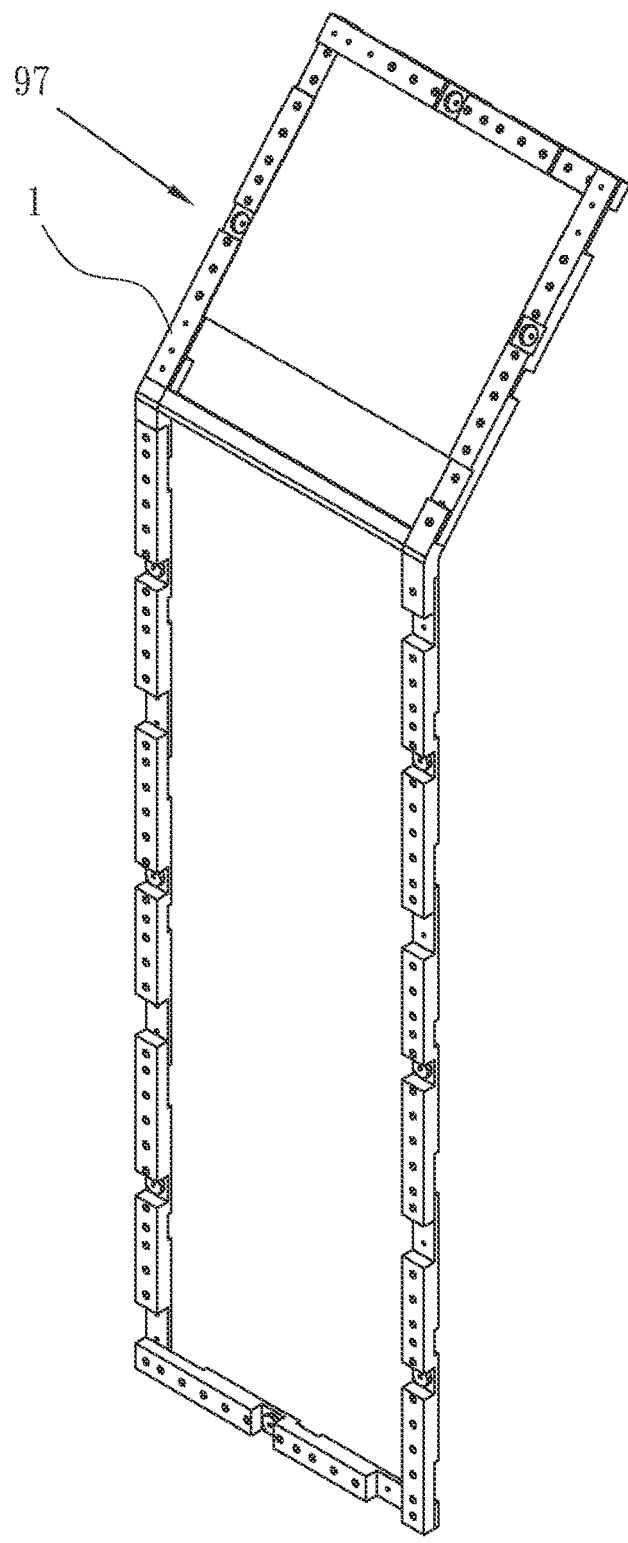
FIG. 8 another perspective view showing the application of the universal connecting rod assembly according to the preferred embodiment of the present invention.
Figure 9:
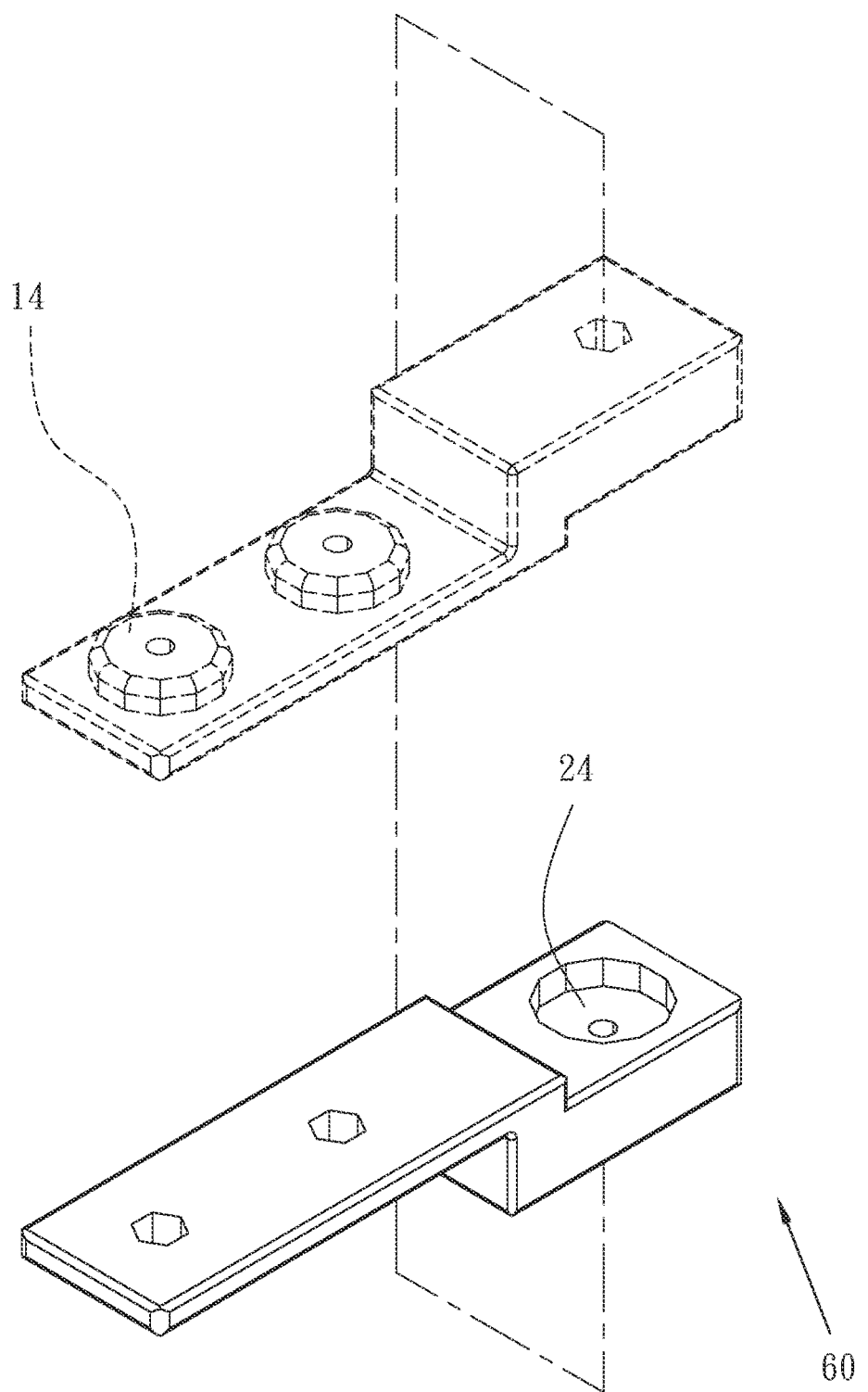
FIG. 9 is a perspective view showing the exploded components of a part of the universal connecting rod assembly according to the preferred embodiment of the present invention.
Figure 10:
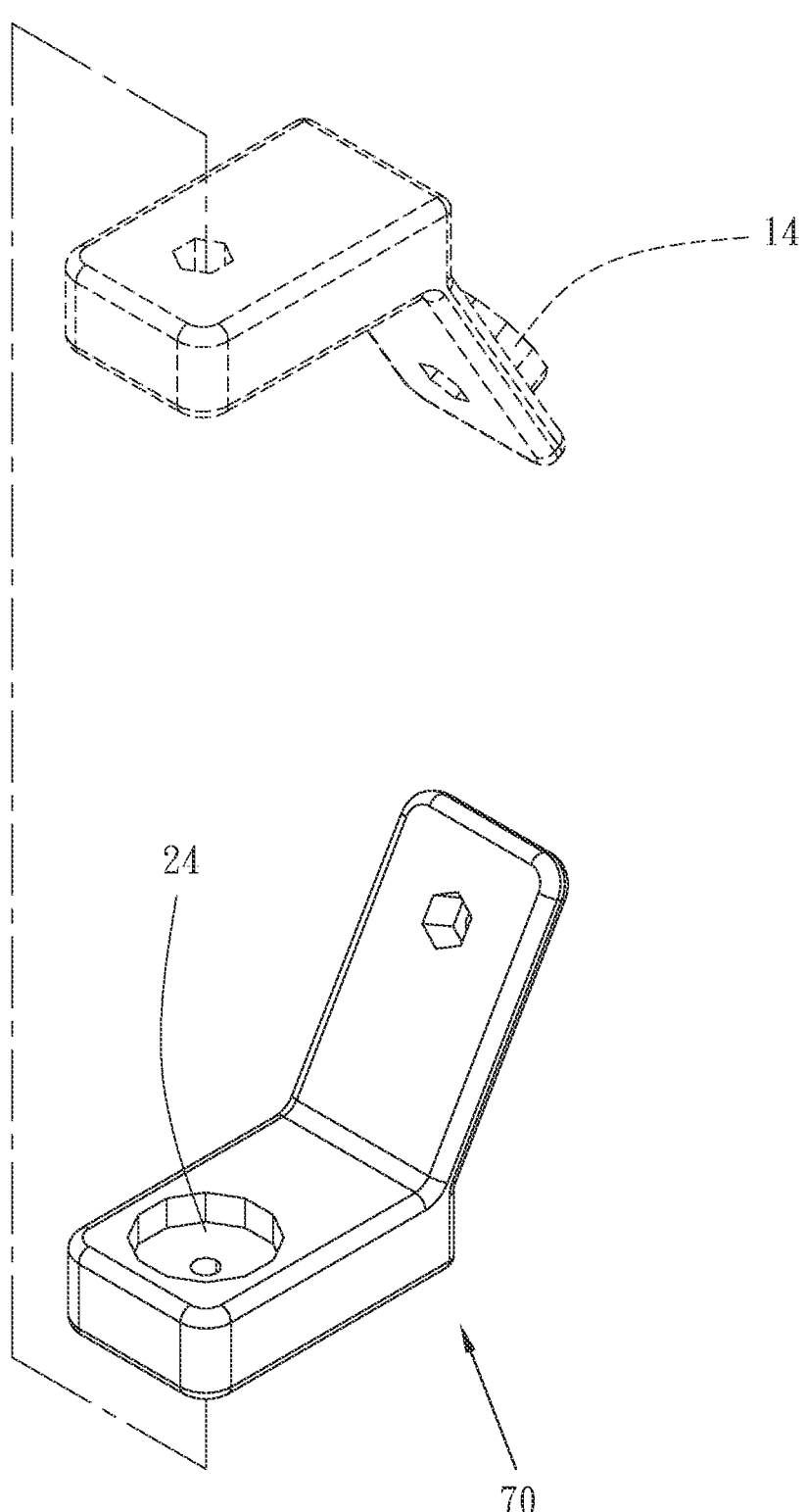
FIG. 10 is also a perspective view showing the exploded components of a part of the universal connecting rod assembly according to the preferred embodiment of the present invention.
Figure 11:
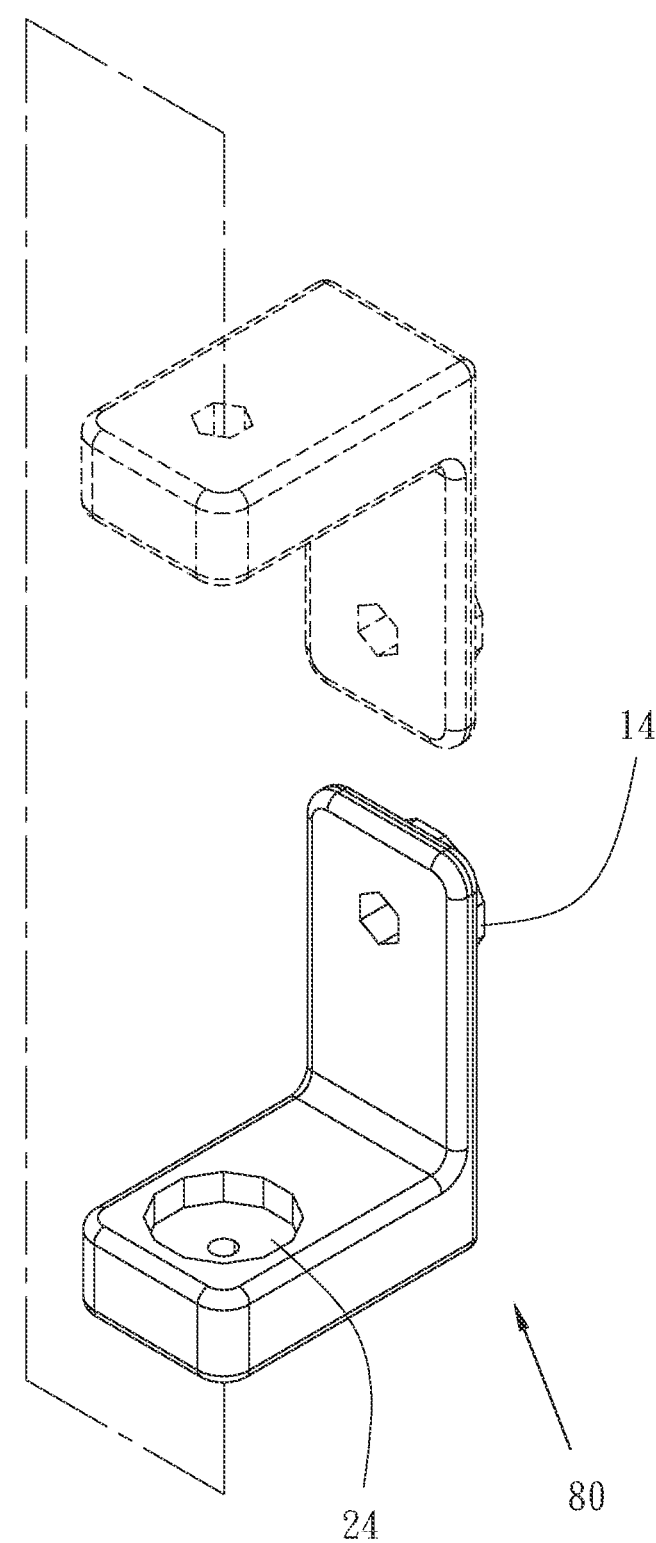
FIG. 11 is still a perspective view showing the exploded components of a part of the universal connecting rod assembly according to the preferred embodiment of the present invention.

As illustrated in FIGS. 1 and 3, the multiple elongated rods 1 are connected to form a daily necessity.

As shown in FIGS. 1 and 3, the multiple elongated rods 1 are connected to form the daily necessity, such as a coat hanger 92.

As shown in FIGS. 1 and 4-8, the multiple elongated rods 1 are connected to form commercial supplies.

With reference to FIGS. 1 and 4-8, the multiple elongated rods 1 are connected to form the commercial supplies, and the commercial supplies are any one of a flagpole 93, a triangle 95, a circle 96, a billboard 97, an advertising sign 94 and a display stand Referring to FIGS. 1 and 9-11, the multiple elongated rods 1 are configured to mate with multiple third connectors 60, multiple fourth connectors 70, and multiple fifth connectors 80, wherein a respective one third connector 60 includes at least one first male multi-angle connection portions 14 formed on at least one surface of the respective one third connector 60, and the respective one third connector 60 includes at least one second female multi-angle connection portion 24 formed on other surfaces of the respective one third connector 60. A respective one fourth connector 70 includes at least one first male multi-angle connection portions 14 formed on at least one surface of the respective one fourth connector 70, and the respective one fourth connector 70 includes at least one second female multi-angle connection portion 24 formed on other surfaces of the respective one fourth connector 70. A respective one fifth connector 80 includes at least one first male multi-angle connection portions 14 formed on at least one surface of the respective one fifth connector 80, and the respective one fifth connector 80 includes at least one second female multi-angle connection portion 24 formed on other surfaces of the respective one fifth connector 80.

When introducing elements of the present invention or the preferred embodiments thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A universal connecting rod assembly comprising:
    multiple elongated rods, and a respective one elongated rod including an upper face and a lower face opposite to the upper face;
    wherein the upper face has a slot defined on a side thereof, and a first male multi-angle connection portion adjacent to a head end of the slot;
    wherein the lower face has a groove defined on a side thereof, and a first female multi-angle connection portion proximate to a distal end of the groove;
    wherein the upper face also has at least one trench defined close to a center thereof, and a second male multi-angle connection portion formed on the at least one trench;
    wherein the lower face has at least one notch defined close to a center thereof, and a second female multi-angle connection portion, wherein the at least one notch is not aligned with the at least one trench; and
    wherein the respective one elongated rod further includes multiple spaced through orifices passing therethrough, and a respective one through orifice has at least one hexagonal hole defined on at least one end thereof.

2. The universal connecting rod assembly as claimed in claim 1, wherein the first male multi-angle connection portion and the second female multi-angle connection portion are adjustably connected in any one shape of a connection of a polygonal column and a polygonal hole, a connection of multiple teeth, a connection of multiple squares, a connection of multiple arcuate protrusions, a connection of multiple columns and recessed holes, and a connection of multiple protrusions and recesses.

3. The universal connecting rod assembly as claimed in claim 1, wherein the multiple elongated rods are configured to mate with multiple first connectors and multiple second connectors to connect a three-dimensional frame, wherein a respective one first connector includes three axial protrusions, two first male multi-angle connection portions of two of the three axial protrusions, and a second female multi-angle connection portion of the other axial protrusion; a respective one second connector includes three axial projections, two second male multi-angle connection portions of two of the three axial projections, and a first male multi-angle connection portion of the other axial projection.

4. The universal connecting rod assembly as claimed in claim 1, wherein the multiple elongated rods are connected to form a daily necessity.

5. The universal connecting rod assembly as claimed in claim 4, wherein the daily necessity is a coat hanger.

6. The universal connecting rod assembly as claimed in claim 1, wherein the multiple elongated rods are connected to form commercial supplies.

7. The universal connecting rod assembly as claimed in claim 6, wherein the commercial supplies are any one of a flagpole, a triangle, a circle, a billboard, an advertising sign and a display stand.

8. The universal connecting rod assembly as claimed in claim 1, wherein the multiple elongated rods are configured to mate with multiple third connectors, multiple fourth connectors, and multiple fifth connectors; wherein a respective one third connector includes at least one first male multi-angle connection portions formed on at least one surface of the respective one third connector, and the respective one third connector includes at least one second female multi-angle connection portion formed on other surfaces of the respective one third connector; a respective one fourth connector includes at least one first male multi-angle connection portions formed on at least one surface of the respective one fourth connector, and the respective one fourth connector includes at least one second female multi-angle connection portion formed on other surfaces of the respective one fourth connector; a respective one fifth connector includes at least one first male multi-angle connection portions formed on at least one surface of the respective one fifth connector, and the respective one fifth connector includes at least one second female multi-angle connection portion formed on other surfaces of the respective one fifth connector.

* * * * *